United States Patent
Jones et al.

(10) Patent No.: US 8,302,151 B2
(45) Date of Patent: Oct. 30, 2012

(54) IMPROVING COMPREHENSION OF INFORMATION IN A SECURITY ENHANCED ENVIRONMENT BY REPRESENTING THE INFORMATION IN AUDIO FORM

(75) Inventors: Daniel Horacio Jones, Round Rock, TX (US); Thomas Girard Lendacky, Austin, TX (US); Emily Jane Ratliff, Austin, TX (US); George Conerly Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 12/131,147

(22) Filed: Jun. 2, 2008

(65) Prior Publication Data

US 2009/0300708 A1    Dec. 3, 2009

(51) Int. Cl.
*G06F 17/00* (2006.01)
(52) U.S. Cl. .................. 726/1; 340/384.73; 704/258
(58) Field of Classification Search . 726/1; 340/384.73; 704/258
See application file for complete search history.

(56) References Cited

U.S. PATENT DOCUMENTS

| | | | |
|---|---|---|---|
| 3,641,496 A * | 2/1972 | Slavin | 704/274 |
| 4,644,327 A * | 2/1987 | Patterson | 340/384.5 |
| 5,572,673 A * | 11/1996 | Shurts | 726/17 |
| 5,715,412 A | 2/1998 | Aritsuka et al. | |
| 7,190,794 B2 | 3/2007 | Hinde | |
| 2004/0013086 A1* | 1/2004 | Simon et al. | 370/230 |
| 2005/0021980 A1* | 1/2005 | Kanai | 713/182 |
| 2007/0005780 A1 | 1/2007 | Hanson | |
| 2007/0107046 A1* | 5/2007 | Jaeger et al. | 726/4 |
| 2008/0055054 A1* | 3/2008 | Tung et al. | 340/384.73 |
| 2009/0024276 A1* | 1/2009 | Mercurio et al. | 701/36 |

* cited by examiner

*Primary Examiner* — Haresh N Patel
*Assistant Examiner* — Dao Ho
(74) *Attorney, Agent, or Firm* — Yee & Associates, P.C.; Steven L. Bennett

(57) ABSTRACT

In a software environment wherein one or more subjects respectively seek to access one or more objects, and wherein a security policy having rules is associated with the environment, a method is provided for use in connection with an effort by a particular subject to access a particular object. The method comprises identifying a domain to which the particular subject belongs, and identifying a type that includes or characterizes the particular object. One or more rules of the security policy are then used to decide whether to permit the particular subject to access the particular object. The method further comprises providing one or more distinct audible sounds for a user associated with the particular subject, wherein each audible sound represents specified information pertaining to the decision of whether or not to permit access to the particular object.

11 Claims, 4 Drawing Sheets

IMPROVING COMPREHENSION OF INFORMATION IN A SECURITY ENHANCED ENVIRONMENT BY REPRESENTING THE INFORMATION IN AUDIO FORM

BACKGROUND OF THE INVENTION

1. Field of the Invention

The invention disclosed and claimed herein generally pertains to a method for improving comprehension of security labels and other information in a security enhanced environment, by representing the information to a user in selected audio forms. More particularly, the invention pertains to a method of the above type wherein, in response to an effort by a subject in a particular domain to access an object of a particular type, different audio signals or sounds may be used to indicate that access has respectively been permitted or denied.

2. Description of the Related Art

In a software security environment such as Security Enhanced (SE)Linux, subjects are associated with or classified into domains, and objects are classified by respective types. When a subject seeks to access a particular object, a decision is made to either grant the subject access to the object, or to deny such access. In SELinux, messages denying access and also certain error messages are typically stored in an Access Vector Cache (AVC), in order to provide an audit trail. In security environments of this type, subjects generally are active entities in a given system, and objects are passive entities in the system. Objects may include, by way of example and not limitation, files, records and messages.

A disadvantage of a security arrangement such as SELinux is that the security policy thereof can be very difficult to create and administer. For example, when SELinux access controls deny access to an object, error messages associated with the denial are often misunderstood by users. Also, domain and type labels used to identify subjects and objects, respectively, are in the form of strings that are typically stored in extended attributes. As a result, detailed messages and audit trails are often forgotten, or are difficult to interpret. Moreover, if a subject in a software program seeks to access an object in a directory, a database or the like, and the label of the subject or the object is not correct, it may be difficult or impossible to gain access. As a further problem, security policy often requires the use of sophisticated graphic user interface tools, and it can be difficult for users to understand information that SELinux emits, including information pertaining to access decisions.

BRIEF SUMMARY OF THE INVENTION

In a software environment wherein one or more subjects respectively seek to access one or more objects, and wherein a security policy having rules is associated with the environment, a method is provided for use in connection with an effort by a particular subject to access a particular object. The method comprises identifying a domain to which the particular subject belongs, and identifying a type that includes the particular object. One or more rules of the security policy are then used to decide whether or not to permit the particular subject to access the particular object. The method further comprises providing one or more distinct audible sounds for a user associated with the particular subject, wherein each audible sound represents specified information pertaining to the decision of whether or not to permit access to the particular object.

DETAILED DESCRIPTION OF THE INVENTION

Figure 1:
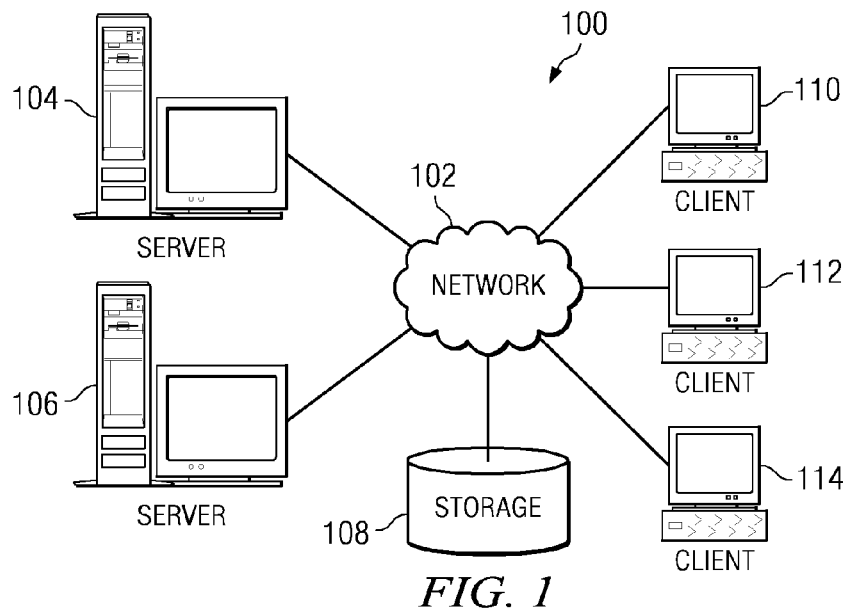
FIG. 1 is a block diagram depicting a system in an environment in which embodiments of the invention may be used.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, there is shown a block diagram of a system 100, comprising an environment in which embodiments of the present invention may be implemented. System 100 is a network of computers and other components that includes network 102, the medium used to provide communication links between various devices and computers connected together within system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. System 100 may include additional servers, clients, and other devices not shown.

In the depicted example, network 102 of system 100 could be the Internet, including a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. System 100 also may be implemented as a number of different types of networks, such as for example, an intranet, a local area network (LAN), or a wide area network (WAN). FIG. 1 is intended as an example, and not as an architectural limitation for different embodiments of the present invention.

Figure 2:
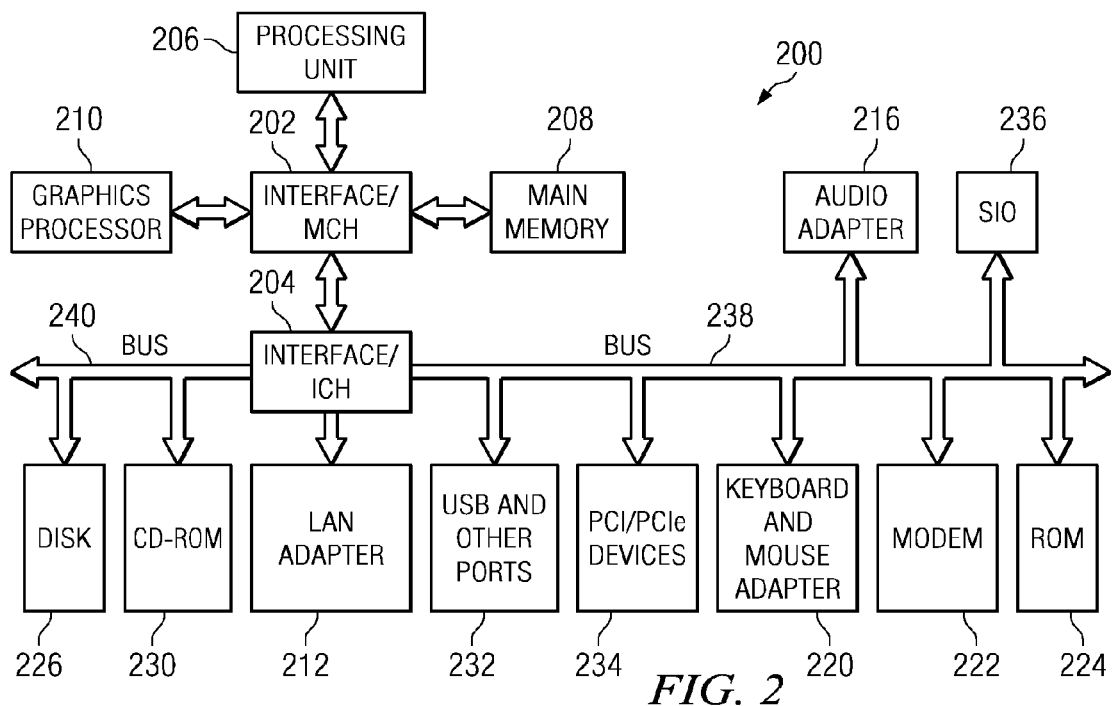
FIG. 2 is a block diagram showing a data processing system which may be used as one or more of the components in the environment of FIG. 1, and may also be used in implementing embodiments of the invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
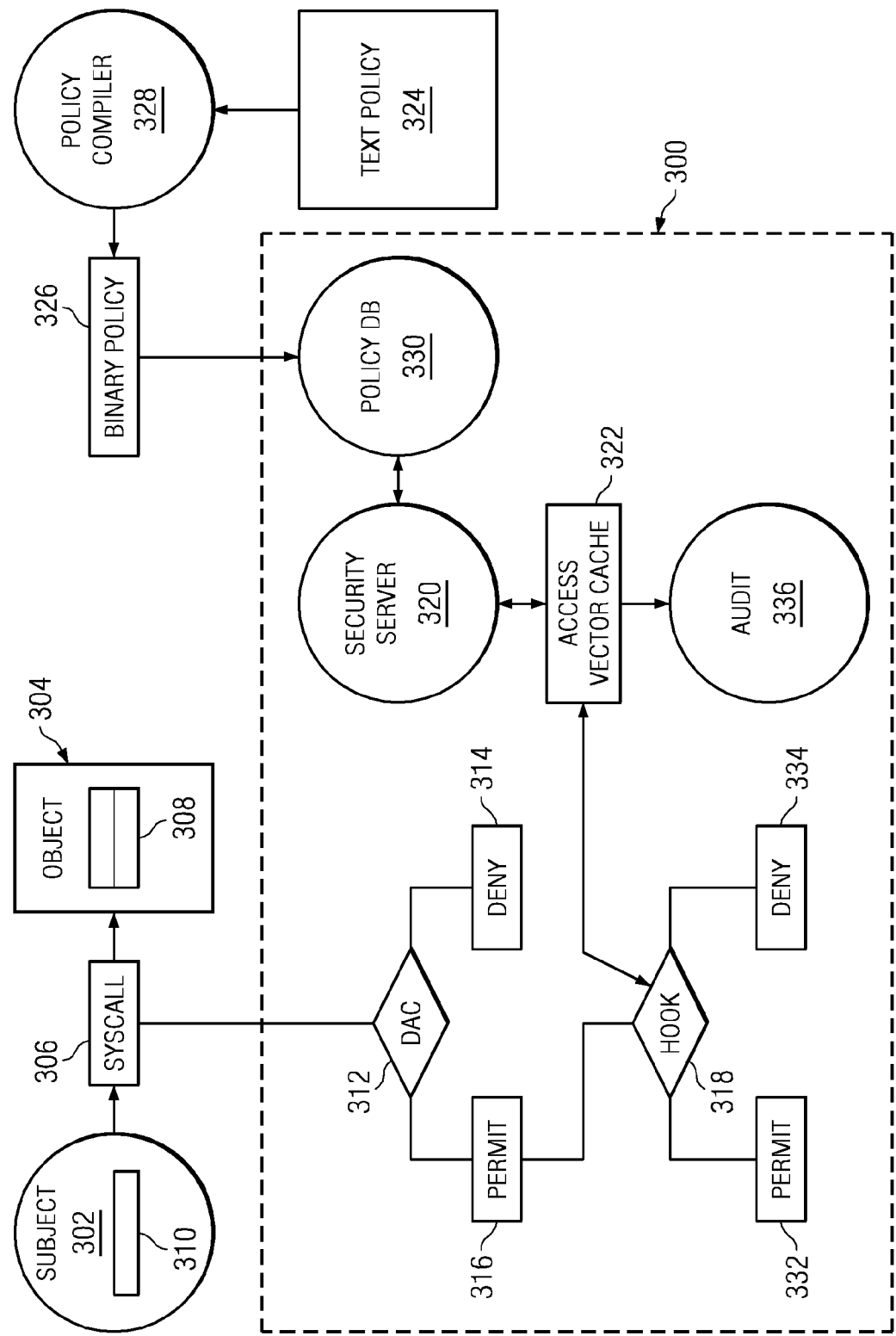
FIG. 3 is a schematic diagram illustrating components for an embodiment of the invention.

Referring to FIG. 3, there is shown a configuration 300 of SELinux components, together with a subject 302 that seeks to access an object 304, and a syscall operation or mechanism 306 positioned between subject 302 and object 304. In response to a request from subject 302 to access object 304, syscall mechanism 306 triggers a message that is directed to configuration 300. The message queries the configuration of SELinux components to determine whether the requested access will be permitted or denied. Subject 302 may comprise, by way of example and not limitation, a server, a client, a process or application residing in a server or client, or a human user of a computer workstation. Object 304 is a passive system entity, as described above, and may comprise without limitation a file, a record or one or more messages.

FIG. 3 further shows object 304 provided with a Type Enforcement (TE) or context label 308, wherein label 308 identifies the type to which object 304 belongs. Examples of object types would include types designated as bin_t and home dir_t. Similarly, subject 302 is provided with a label 310 that identifies the domain of subject 302. Examples of subject domains could be staff_u:sysadm_r:sysdam_t, staff_u:staff_r:staff_t, staff_u:secadm_r:secadm_t; and system u:system_rsyslogd_t; or more simply sysadm_t, staff_t, and secadm_t, and syslogd_t, respectively.

Referring further to FIG. 3, there is shown a discretionary access component (DAC) 312 included in the SELinux configuration 300. In accordance with a security policy associated with configuration 300, described hereinafter in further detail, an owner of object 304 may be granted some limited discretion to deny a subject access to object 304, as indicated by deny decision message 314. However, if the owner of object 304 has no such limited discretion, or the limited discretion does not extend to subject 304, the query regarding the access request will be permitted by DAC 312, as indicated by permit decision message 316, and the query proceeds to a Linux Security Module (LSM) hook 318. Hook 318 comprises one of a number of hooks, or upcalls to the LSM. The LSM generally inserts a hook at every point in the LSM kernel where a user-level system call is about to result in access to an important internal kernel object, such as an inode or a task control block.

FIG. 3 further shows a security server 320, which receives the access request query from hook 318 through an access vector cache (AVC) 322. Security server 320 is the decision making entity of SELinux components configuration 300. A security policy for controlling object access decisions by configuration 300 is shown in textual form 324, wherein the policy comprises a set of rules, and is converted into executable binary form 326 by a policy compiler 328. The binary form policy is stored in a policy database 330, which may be accessed by the security server 320.

An important function of the security policy is to specify whether or not subjects of a given domain are allowed to access objects classified into a specified object type. Accordingly, the access request query received by security server 320 includes both the domain of subject 302 and the type of object 304, as identified by labels 310 and 308, respectively. Server 320 then consults the rules of the security policy contained in database 330, in order to determine whether the policy permits a subject in the domain of subject 302 to access the type to which object 304 belongs. The conclusion made by security server 320 is then implemented as either an access permit message 332, or an access deny message 334.

Usefully, messages denying access are stored in AVC cache 322, and an audit function 336 can be used to provide an audit trail of denial messages. Security server 320 could, for example, refer to a previous denial when considering an access request that involved the same subject domain and/or object type as the previous denial.

Figure 4:
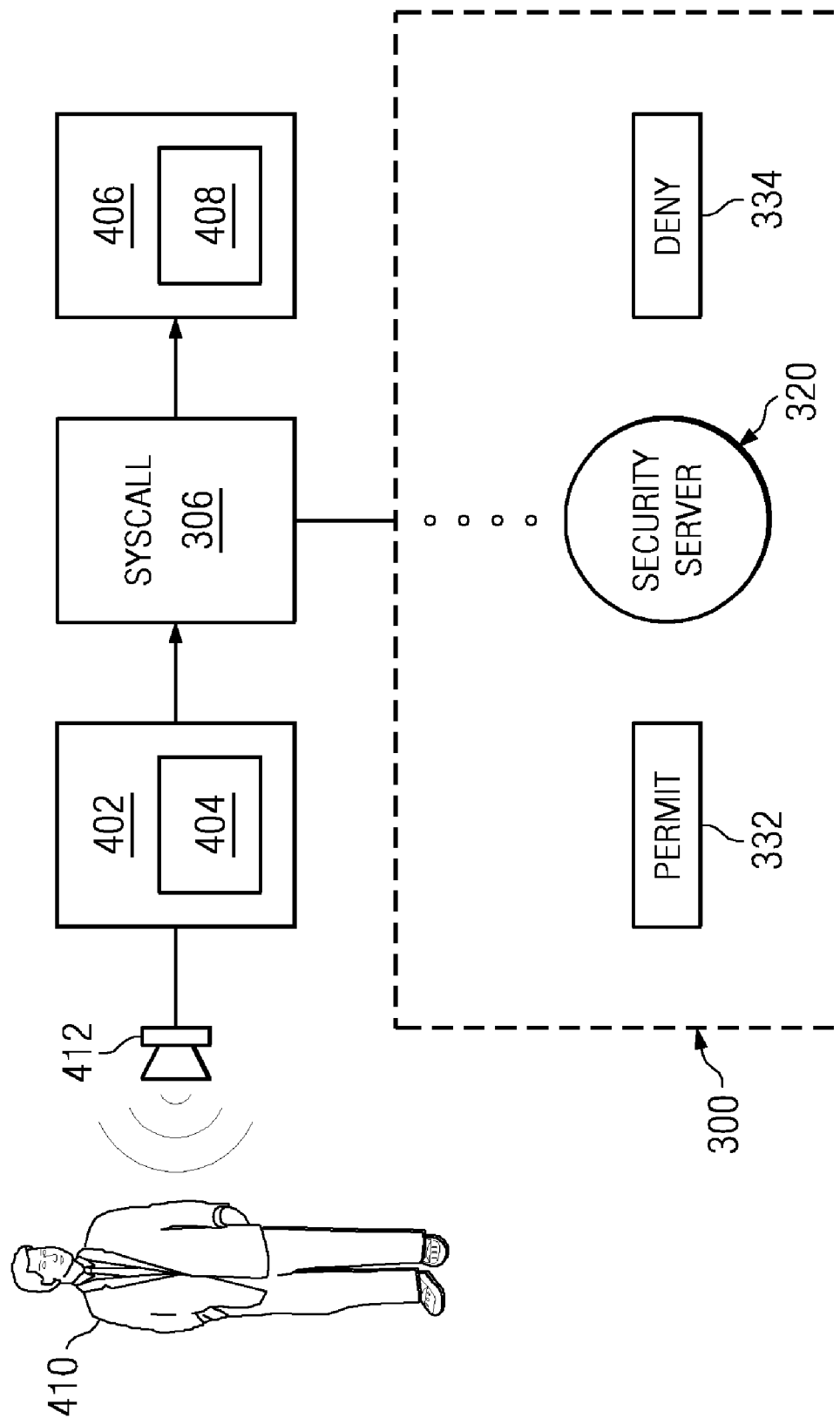
FIG. 4 is a schematic diagram further illustrating components for an embodiment of the invention.

Referring to FIG. 4, there is shown a partial representation of the configuration 300 of SELinux components described above. There is further shown a subject 402 belonging to a domain identified by a label 404, wherein subject 402 seeks to access an object 406 classified into a type identified by a label 408. Accordingly, subject 402 is connected to send an access request to syscall mechanism 306, likewise described above. Security server 320 of configuration 300 then decides whether to permit or deny the access request, and produces a corresponding permit message 332 or deny message 334, respectively.

In a useful embodiment of the invention, subject 402 comprises a computer system or other workstation of a human user 410. An audio device 412 such as a loudspeaker, for producing audible sounds that can be readily heard by user 410, is operated or driven by the subject 402. In the embodiment, if security server 320 provides a message 332 that permits subject 402 to access object 406, subject 402 will operate device 412 to produce a particular distinctive tone or other sound. On the other hand, if security server 320 decides to deny the access request and provides a message 334, device 412 is operated to produce a different distinctive sound. As an example, if subject 402 initially attempts to access object 406 and sends out an access request, a harmonious sound is generated. Then, if device 412 continues to produce a consonant or harmonious sound, user 410 understands that access has been granted. However, if the initial harmony is followed by an interval of dissonant sound, user 410 understands that access has been denied. Alternatively, a harmonious sound could be used to indicate grant of access, while an arpeggio is used to indicate denial.

It is to be understood that many types of sounds could be generated to communicate information to a user 410, in accordance with embodiments of the invention. Examples of such sound types, without intending any limitation, could include tones of fixed frequencies, musical tones, sounds and harmonies, and ringing, tapping or whistling sounds. Recorded or synthetic human speech could also be used. Moreover, it is to be understood that numerous types of devices, including loudspeakers and headphones but by no means limited thereto, could be used as the device 312, in order to produce sounds in accordance with embodiments of the invention.

In a further useful embodiment, the user 310 would not be notified of decisions regarding access requests, whenever a decision was to permit access. In these situations, the subject would simply proceed to access the specified object. Thus, the user would only receive notice of a decision when the security server 320 has decided to deny access. In this embodiment, device 312 would generate a first tone or other audible sound, in order to indicate an access denial decision. A distinctly different second tone or other sound would be generated, when a decision to deny had not been made, but access to object 406 by subject 402 could not take place due to some other reason, such as a system error or defect. For example, a component required to access object 406 could have failed to operate properly, or a timeout may have occurred in the system before security server 320 made a decision to either permit or deny a requested access.

As an alternative in this embodiment, while a first distinct sound would indicate a decision to deny access, a second sound would provide notice to user 410 of the reason for the denial. For example, the second sound could indicate that no subject having the label 404, identifying the particular domain of subject 402, was allowed to access objects of the type identified by label 408. Moreover, a multiplicity of different sounds could be used, in order to indicate different reasons for denying a subject 402 access to object 406.

It is anticipated that embodiments of the invention can be usefully employed in developing software programs, for an SELinux environment or the like, wherein subjects included in domains as described above must access objects of particular types. Clearly, the domain and type labels respectively applied to subjects and objects in a program must allow required access of objects to take place, in view of the security policy applied to the environment. For example, implementation of a program could require that a program subject must be able to access data in an object that comprises a directory or database. The program developer could initially construct a segment of the program based on the belief that a subject labeled domain X was permitted by rules of the security policy to access an object of type A. The developer would then execute the program or program segment to perform a test. In accordance with this embodiment, device 412 could produce two different distinctive sounds, wherein one sound informs the developer that a subject with a label of domain X was not permitted to access an object of type A. The other sound would indicate that such access was permitted.

In a further embodiment, different tones produced by device 412 could represent different violations in an SELinux environment, such as violations detected by the feature setroubleshootd. Also, the screen reader could display a list of subject and object labels, and each label could be represented by a different distinctive sound. This would enable labels to be much more easily used and manipulated by persons who are sight impaired.

Figure 5:
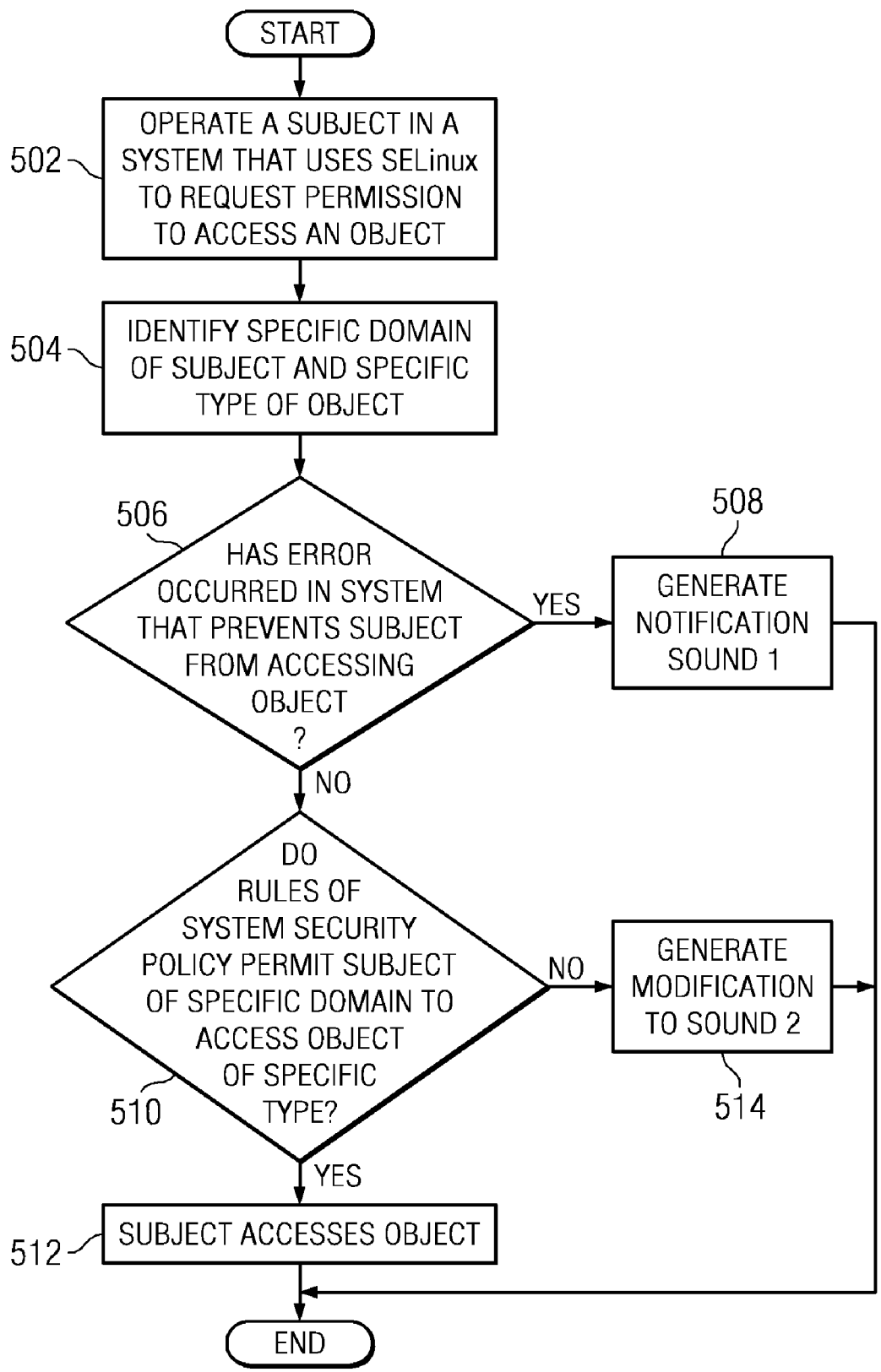
FIG. 5 is a flowchart showing principal steps for a method comprising an embodiment of the invention.

Referring to FIG. 5, there are shown principal steps for a method comprising an embodiment of the invention. At step 502, a subject in a system that uses SELinux requests permission to access a specified object. The specific domain of the subject and the specific type of the object are then determined or identified at step 504.

As described above, an error or default could occur in the system that would prevent the subject from accessing the object, where the error was unrelated to any access decision that was based on security policy. Accordingly, at step 506 the method determines whether any such error has occurred. If this query is positive, a first notification sound (Sound 1) is generated at step 508. Otherwise, the method proceeds to step 510.

Referring further to FIG. 5, step 510 shows that it is necessary to determine whether the rules of the system permit the object of the specific domain to access the object of the specific type. If so, the subject accesses the object at step 512. If not, a second notification sound (Sound 2) is generated at step 514, and the method ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a security enhanced (SE)Linux software environment wherein one or more subjects respectively seek to access one or more objects, wherein a security policy having rules is associated with the environment and a particular subject commences an effort to access a particular object, comprising the steps of:
   a subject submitting a request for permission to access an object to a syscall mechanism;
   the syscall mechanism submitting a message query to a discretionary access component;
   identifying a domain to which said particular subject belongs;
   identifying a type that includes said particular object;
   a security server receiving the message query from the discretionary access component;
   using one or more rules of said security policy to decide whether or not to permit said particular subject to access said particular object, to create an access decision; and
   responsive to the access decision, producing in an audio device at least two distinct audible sounds for a user associated with said particular subject, each audible sound communicates specified information pertaining to said decision of whether or not to permit access; a first one of said sounds is generated to indicate a decision that denies said particular subject access to said particular object and a second audible sound is generated to indicate a decision permitting said particular subject to access said particular object, and said particular subject and said particular object each has an identifying label, and different distinct audio signals are used to represent different labels.

2. The method of claim 1, wherein: a third distinct audible sound is generated to indicate that an error has occurred in the effort of said particular subject to access said particular object.

3. The method of claim 1, wherein: said first one of said sounds comprises a dissonant sound, and said second sound comprises a consonant harmonious sound.

4. The method of claim 1, wherein: said decision of whether or not to permit access is made by a security server.

5. The method of claim 4, wherein: decisions to deny access are stored as part of an audit trail contained in an Access Vector Cache.

6. The method of claim 1, wherein: one of said object labels comprises a home type file label, and another object label comprises an executable type file label.

7. A computer program product embodied in a non-transitory computer readable medium, executed in a processor, in a security enhanced (SE)Linux software environment wherein one or more subjects respectively seek to access one or more objects, wherein a security policy having rules is associated with the environment and a particular subject commences an effort to access a particular object, comprising:
   instructions to submit a request for permission by a subject to access an object to a syscall mechanism;
   instructions for the syscall mechanism to submit a message query to a discretionary access component;
   instructions to identify a domain to which said particular subject belongs;
   instructions to identify a type that includes said particular object;
   instructions for a security server to receive the message query from the discretionary access component;
   instructions to use one or more rules of said security policy to decide whether or not to permit said particular subject to access said particular object, to create an access decision; and
   instructions to produce, responsive to the access decision, in an audio device at least two distinct audible sounds for a user associated with said particular subject, each audible sound communicates specified information pertaining to said decision of whether or not to permit access; a first one of said sounds is generated to indicate a decision that denies said particular subject access to said particular object and a second audible sound is generated to indicate a decision permitting said particular subject to access said particular object, and said particular subject and said particular object each has an identifying label, and different distinct audio signals are used to represent different labels.

8. The computer program product of claim 7, wherein: a third distinct audible sound is generated to indicate that an error has occurred in the effort of said particular subject to access said particular object.

9. An apparatus, in a software environment wherein one or more subjects respectively seek to access one or more objects, wherein a security policy having rules is associated with the environment and a particular subject commences an effort to access a particular object, comprising:
- a first configured device to identify a domain to which said particular subject belongs, and for identifying a type that includes said particular object;
- a second configured device including a security server to receive a message query and to use one or more rules of said security policy to decide whether or not to permit said particular subject to access said particular object, to create an access decision, the security server configured to receive the message query from a discretionary access component through a hook and through an access vector cache; and
- a third configured device to generate, responsive to the access decision, in an audio device at least two distinct audible sounds for a user associated with said particular subject, each audible sound communicates specified information pertaining to said decision of whether or not to permit access, a first one of said sounds is generated to indicate a decision that denies said particular subject access to said particular object, and a second one of said audible sounds is generated to indicate that an error has occurred in the effort of said particular subject to access said particular object, and said particular subject and said particular object each has an identifying label, and different distinct audio signals are used to represent different labels.

10. The apparatus of claim 9, wherein: said software environment comprises a security enhanced (SE)Linux environment.

11. The apparatus of claim 9, wherein: said third configured device is disposed to generate a third distinct audible sound to indicate a decision permitting said particular subject to access said particular object.

* * * * *